United States Patent [19]

Naraghi

[11] Patent Number: 5,746,973
[45] Date of Patent: *May 5, 1998

[54] METHOD FOR REDUCING ODORANT DEPLETION

[76] Inventor: Ali Naraghi, 3614 Oakwick Forest Dr., Missouri City, Tex. 77459

[ * ] Notice: The term of this patent shall not extend beyond the expiration date of Pat. No. 5,611,991.

[21] Appl. No.: 677,891

[22] Filed: Jul. 10, 1996

[51] Int. Cl.$^6$ ............................................. B01J 19/00
[52] U.S. Cl. ......................... 422/41; 422/7; 422/15; 422/16; 422/40; 427/230; 427/235; 507/238; 507/239
[58] Field of Search ......................... 422/7, 15, 16, 422/40, 41; 427/230, 235, 239; 507/238, 239

[56] References Cited

U.S. PATENT DOCUMENTS

| | | | |
|---|---|---|---|
| 4,701,303 | 10/1987 | Nevers | 422/41 |
| 5,611,911 | 3/1997 | Araghi | 422/15 |
| 5,611,992 | 3/1997 | Araghi | 422/15 |

Primary Examiner—Ponnathapura Achutamurthy
Attorney, Agent, or Firm—Gunn & Associates, P.C.

[57] ABSTRACT

Odorant depletion is reduced by passivating the internal surface of LP-gas transportation and storage vessels by the addition of passivating agents comprising mixtures of corrosion inhibitors such as phosphate esters, fatty amines, poly amides, imidazolines, poly imidazolines, quaternary amines, poly quats, dimer acids, trimer acids, polymeric acids, ethoxylated fatty amines, ethoxylated polyamides, ethoxylated alcohols and mixtures thereof in one or more solvents. In a preferred embodiment, the passivating agents contain one or more phosphate esters defined by the equation:

$$[R\text{—}X\text{—}[C_mH_{2m}O]_n]_k\text{—}PO(OH)_{(3-k)}$$

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), a secondary amine group (—NH—) and mixtures thereof;

m is an integer having a value from about 2 to about 4;

n is an integer having a value from about 4 to about 20; and k is an integer having a value from 1 to 2 and one or more fatty amines, poly amides, imidazolines, poly imidazolines, quaternary amines, poly quats, dimer acids, trimer acids, polymeric acids, ethoxylated fatty amines, ethoxylated polyamides, ethoxylated alcohols or mixtures thereof and one or more solvents.

22 Claims, 6 Drawing Sheets

METHOD FOR REDUCING ODORANT DEPLETION

FIELD OF THE INVENTION

This invention relates to a method for reducing odorant depletion during transfer and storage of liquefied petroleum gas.

BACKGROUND

Liquefied petroleum gas (LP-gas), which consists primarily of propane with small amounts of lighter and heavier hydrocarbons, is customarily odorized with ethyl mercaptan or other mercaptan-based compounds so that escaping gas can be detected.

The distribution of propane from the producer where the odorant is injected to the ultimate consumer may require the propane to be transferred several times in and out of different transportation and storage vessels that are typically made of steel.

Since approximately 1986, it has been recognized that mercaptan-based odorants may be depleted during transportation and/or storage, a phenomenon sometimes referred to as "odor fading." This depletion may occur through oxidation of the odorant compound to a sulfide, or possibly through chemical adsorption at the metal surface inside LP-gas transportation or storage vessels.

Attempts have been made to counteract odorant depletion. For example, U.S. Pat. No. 3,669,638 is directed to a method for delivery of a constant dose of odorant wherein odorants are added from an enclosed container through a permeable membrane over selected time periods. U.S. Pat. No. 3,826,631 is directed to an odorant composition that includes an azeotropic mixture of an organic sulfur odorant and at least one relatively non-odorous, chemically inert material capable of forming a minimum boiling point azeotrope with the organic sulfur odorant.

SUMMARY OF THE INVENTION

According to the present invention, odorant depletion is reduced by passivating the internal surface of LP-gas transportation and storage vessels by the addition of passivating agents designed to create a protective film on the surface of the vessel. The term "passivation," as used herein, means the temporary rendering of the internal surface of a vessel less reactive to the odorant than an unpassivated vessel.

Passivation of the internal surface of the vessels can be accomplished by a "fill-up treatment" method wherein the vessel is completely filled with the selected passivating agent and/or by an "additive treatment" method wherein a passivating agent that is dispersible, or more preferably soluble, in propane is added directly to the LP-gas along with the odorant in amounts sufficient to provide a concentration of the selected passivating agent in the range of up to about 250 ppm (v/v).

The passivating agents, which may be water soluble or may be dispersible or soluble in LP-gas, comprise blends of corrosion inhibitors such as phosphate esters, fatty amines, poly amides, imidazolines, poly imidazolines, quaternary amines, poly quats, dimer acids, trimer acids, polymeric acids, ethoxylated fatty amines, ethoxylated polyamides, ethoxylated alcohols and the like or mixtures thereof in one or more solvents. Suitable solvents include, but are not limited to, water, glycol ether, heavy alcohols such as butanol, hexanol and the like, and aromatic solvents such as xylene, toluene and the like. In a preferred embodiment, the passivating agents contain one or more phosphate esters, and, in a more preferred embodiment, contain one or more phosphate esters defined by the equation:

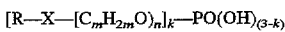

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), a secondary amine group (—NH—) and mixtures thereof;

m is an integer having a value from about 2 to about 4;

n is an integer having a value from about 4 to about 20; and k is an integer having a value from 1 to 2 and one or more fatty amines, poly amides, imidazolines, poly imidazolines, quaternary amines, poly quats, dimer acids, trimer acids, polymeric acids, ethoxylated fatty amines, ethoxylated polyamides, ethoxylated alcohols or mixtures thereof and one or more solvents.

Treatment of LP-gas transportation and/or storage vessels in the manner described herein reduces odorant depletion. Moreover, the passivating agents are not carried out of the tank by the release of the propane gas.

These and other features and advantages of the present invention will become apparent from the following detailed description, which is given by way of illustration only.

DETAILED DESCRIPTION

Figure 1:
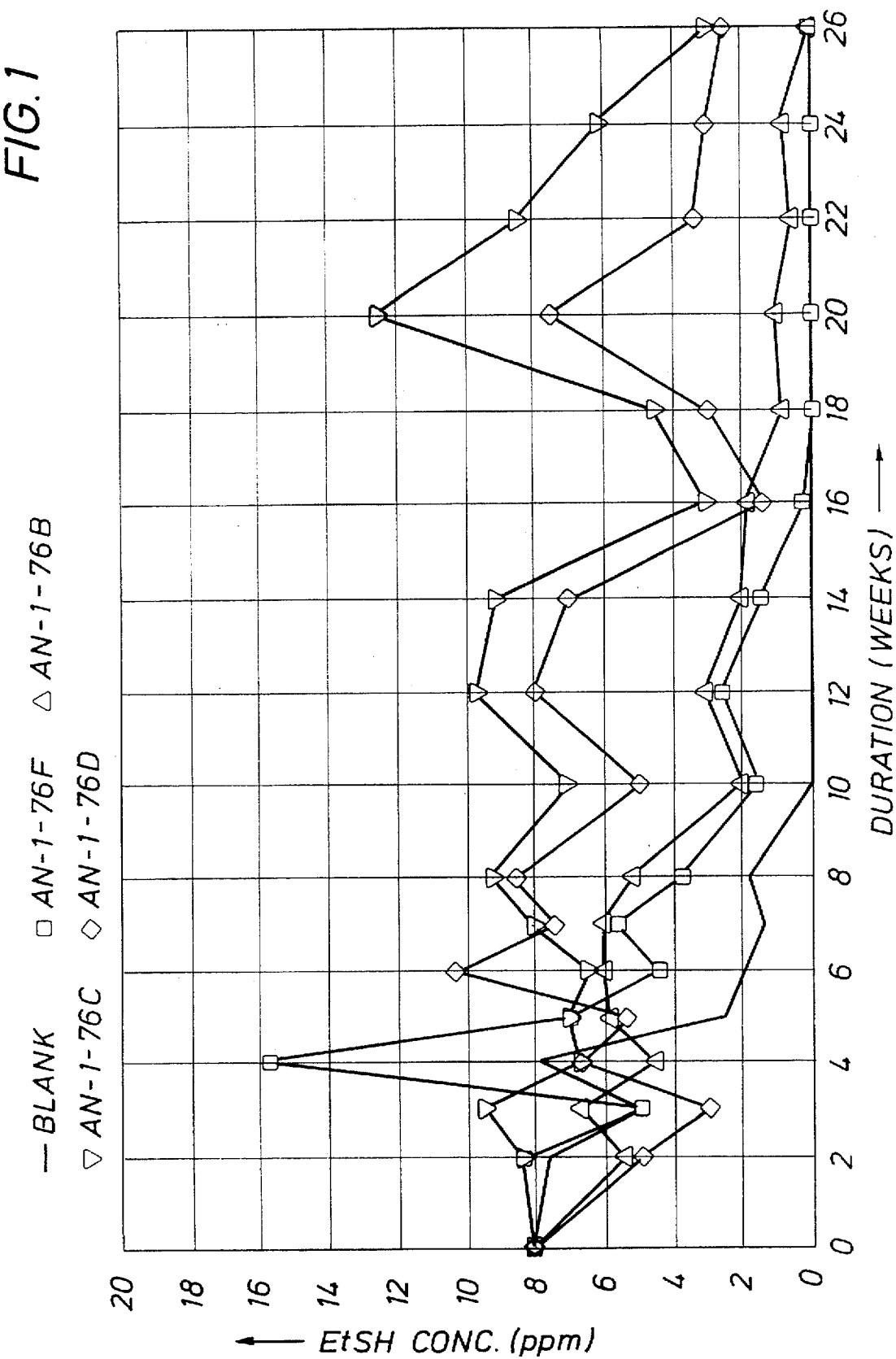
FIG. 1 represents the ethyl mercaptan (EM) concentrations of passivating agents AN-1-76B, AN-1-76C, AN-1-76D, AN-1-76F and the blank in the vapor phase in a 250 gallon tank over a 26 week period.

According to the present invention, odorant depletion is reduced by passivating the internal surface of LP-gas transportation and storage vessels by the addition of passivating agents designed to create a protective film on the surface of the vessel. Passivation of the internal surface of the vessels can be accomplished by a "fill-up treatment" method wherein the vessel is completely filled with the selected passivating agent and/or by an "additive treatment" method wherein a passivating agent that is dispersible, or more preferably soluble, in propane is added directly to the LP-gas along with the odorant in amounts sufficient to provide a concentration of the selected passivating agent in the range of up to about 250 ppm (v/v).

The purpose of the film provided by the fill-up treatment method is to prevent odorant from coming into contact with the tank surface where it can be depleted through absorption or adsorption processes or through oxidation by the metal oxides present at the surface. The purpose of the additive treatment is to maintain the film coating the surface of the vessel. The small amount of passivating agent added by this treatment method replenishes any part of the film that has either been washed off by the LP-gas or been damaged for any other reason.

The passivating agents, which may be water soluble or may be dispersible or soluble in LP-gas, comprise blends of corrosion inhibitors such as phosphate esters, fatty amines, poly amides, imidazolines, poly imidazolines, quaternary amines, poly quats, dimer acids, trimer acids, polymeric acids, ethoxylated fatty amines, ethoxylated polyamides, ethoxylated alcohols and the like or mixtures thereof in one or more solvents. Suitable solvents include, but are not limited to water, glycol ether, heavy alcohols such as butanol, hexanol and the like, and aromatic solvents such as xylene, toluene and the like. In a preferred embodiment, the passivating agents contain one or more phosphate esters, and, in a more preferred embodiment, contain one or more phosphate esters defined by the equation:

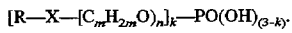

$$[R-X-[C_mH_{2m}O)_n]_k-PO(OH)_{(3-k)}.$$

In accordance with the foregoing formula, R is either an alkyl group or an alkylaryl group. The alkyl group may be linear or branched and contain from 4 to 18 carbon atoms. Where R is an alkylaryl group, it has the same alkyl group as just mentioned with the addition of an aryl group such as phenol, diphenol, other hydroxy containing aryl radicals, alkylated hydroxyaryl group, or mixtures thereof.

The component X is selected from the group consisting of a carboxyl group (—COO—), oxygen (—O—), a secondary amine group (—NH—) and mixtures thereof.

The variable m is an integer having a value from about 2 to about 4.

The variable n is an integer having a value from about 4 to about 20.

The variable k is an integer having a value from 1 to 2.

In the preferred embodiment, the passivating agents further contain one or more fatty amines, poly amides, imidazolines, poly imidazolines, quaternary amines, poly quats, dimer acids, trimer acids, polymeric acids, ethoxylated fatty amines, ethoxylated polyamides, ethoxylated alcohols or mixtures thereof and one or more solvents. Suitable solvents include, but are not limited to water, glycol ether, heavy alcohols such as butanol, hexanol and the like, and aromatic solvents such as xylene, toluene and the like.

Such compositions and their preparation are described in co-pending U.S. patent application Ser. No. 08/599,430 filed Jan. 17, 1996, which is incorporated herein by reference.

As demonstrated by the following tests, treatment of LP-gas transportation and storage vessels in the manner described herein reduces odorant depletion. Moreover, the passivating agents are not carried out of the LP-gas transportation or storage vessel by the release of the propane gas.

Passivating agents designated AN-1-76B, AN-1-76C, AN-1-76D, AN-1-76E and AN-1-76F and having the compositions set forth in TABLE 1 below were evaluated.

TABLE 1

| Constituent | Actual Weight % | Suggested Concentrations By Weight % |
|---|---|---|
| AN-1-76D Water Soluble | | |
| Water | 20 | Approx 10–30 |
| Glycol Ether | 20 | Approx 10–30 |
| Morpholine/ Cyclohexylamine | 5 | Approx 5–15 |
| Quaternary Amines | 8 | Approx 10–19 |
| Imidazoline | 15 | Approx 10–25 |
| Polymeric Acids | 10 | Approx 5–15 |
| Phosphate Esters | 14 | Approx 10–15 |
| Ethoxylated Polyamides | 8 | Approx 5–17 |
| AN-1-76B Water Soluble | | |
| Water | 30 | Approx 20–35 |
| Quaternary Amines | 10 | Approx 8–15 |
| Phosphate Esters | 40 | Approx 20–40 |
| Imidazoline | 10 | Approx 6–26 |
| Isopropanol | 10 | Approx 5–15 |
| AN-1-76C Dispersible in LP-gas | | |
| Aromatic Solvent | 40 | Approx 25–40 |
| Imidazoline | 40 | Approx 25–40 |
| Phosphate Ester | 10 | Approx 7–16 |
| Polymeric Acids | 10 | Approx 16–30 |
| AN-1-76E Soluble in LP-gas | | |
| Glycol Ether | 26 | Approx 15–35 |
| Imidazoline | 66 | Approx 38–77 |
| Fatty Acids | 4 | Approx 3–11 |
| Phosphate Esters | 4 | Approx 2–15 |
| AN-1-76F Dispersible in LP-gas | | |
| Amide/Imidazoline | 6.2 | Approx 4–12 |
| Polymeric Acids | 11.8 | Approx 8–24 |
| Heavy Alcohol | 65 | Approx 40–70 |
| Ethoxylated Alcohol | 4 | Approx 2–6 |
| Isopropyl Alcohol | 13 | Approx 6–20 |

The vessels or tanks were prepared as follows. Forty-five (45) tanks ranging in volume from 5 to 250 gallons were selected.

All tanks arrived sealed and under a positive air pressure. Long term weathering of 41 tanks was achieved by initially purging the tanks with 30 psig of compressed air for 10 minutes, followed by outdoor storage of the tanks with their valves left open for 90 days. For purposes of comparison, tanks #1, 11, 30 and 40 were not subjected to this weathering process. Instead those tanks remained sealed as delivered. The purpose of the weathering was to simulate field conditions and generate or produce some iron oxide inside the tank, which was assumed to be the worst case scenario in terms of odorant depletion. However, with the limited sample it was not possible to demonstrate a difference in odorant depletion between weathered and unweathered tanks.

The tanks were organized in five identical sets of nine. One set was left untreated to serve as a blank, and four sets were treated with passivating agents described in TABLE 1.

Tank assignment is set forth in TABLE 2.

TABLE 2

| Tank # | Tank Size | Passivating Agent |
| --- | --- | --- |
| 1 | 250 gal. | Blank |
| 2 | 250 gal. | Blank |
| 3 | 250 gal. | AN-1-76F |
| 4 | 250 gal. | AN-1-76F |
| 5 | 250 gal. | AN-1-76B |
| 6 | 250 gal. | AN-1-76B |
| 7 | 250 gal. | AN-1-76C |
| 8 | 250 gal. | AN-1-76C |
| 9 | 250 gal. | AN-1-76D |
| 10 | 250 gal. | AN-1-76D |
| 11 | 120 gal. | Blank |
| 12 | 120 gal. | Blank |
| 13 | 120 gal. | AN-1-76F |
| 14 | 120 gal. | AN-1-76F |
| 15 | 120 gal. | AN-1-76B |
| 16 | 120 gal. | AN-1-76B |
| 17 | 120 gal. | AN-1-76C |
| 18 | 120 gal. | AN-1-76C |
| 19 | 120 gal. | AN-1-76D |
| 20 | 120 gal. | AN-1-76D |
| 21 | 25 gal. | AN-1-76F |
| 22 | 25 gal. | AN-1-76F |
| 23 | 25 gal. | AN-1-76B |
| 24 | 25 gal. | AN-1-76B |
| 25 | 25 gal. | AN-1-76C |
| 26 | 25 gal. | AN-1-76C |
| 27 | 25 gal. | AN-1-76D |
| 28 | 25 gal. | AN-1-76D |
| 29 | 25 gal. | Blank |
| 30 | 25 gal. | Blank |
| 31 | 5 gal. | AN-1-76F |
| 32 | 5 gal. | AN-1-76F |
| 33 | 5 gal. | AN-1-76F |
| 34 | 5 gal. | AN-1-76B |
| 35 | 5 gal. | AN-1-76B |
| 36 | 5 gal. | AN-1-76B |
| 37 | 5 gal. | AN-1-76C |
| 38 | 5 gal. | AN-1-76C |
| 39 | 5 gal. | AN-1-76C |
| 40 | 5 gal. | Blank |
| 41 | 5 gal. | Blank |
| 42 | 5 gal. | Blank |
| 43 | 5 gal. | AN-1-76D |
| 44 | 5 gal. | AN-1-76D |
| 45 | 5 gal. | AN-1-76D |

The tanks were passivated by the fill-up treatment method. That is, the valve was removed from each tank and the tank completely filled with the selected passivating agent. The tank was then closed and the passivating agent was left in the tank for 10 minutes. During that 10 minute period, the tank was lifted and rolled so that all interior surfaces came in contact with the passivating agent. At the end of ten minutes, the tank was drained, and the excess passivating agent was transferred to the next untreated tank and the procedure repeated. When the passivation of all 9 tanks in the selected set was completed, the excess passivating agent was returned to the original drums. After four days, all tanks, both treated and blanks, were evacuated to 20 inches vacuum with a commercial pump to remove air and solvent vapors.

All evacuated tanks, both treated and blanks, were filled with freshly odorized LP-gas. Odorization followed industry practice of 1.5 lb. of ethyl mercaptan per 10,000 gallons of LP-gas.

Odorant (ethyl mercaptan) concentration was then measured in the gas output of each tank. Ethyl mercaptan concentrations were measured in ppm (v/v) using Sensidyne stain tubes #72 according to the Gas Processors Association Test Method. The stated accuracy of the stain tubes is ±25%. In order to increase the accuracy, each tank was sampled using two to four full strokes of the sampling syringe and the ethyl mercaptan concentration read directly from the tube was divided by the number of strokes. Four strokes were used except in cases where the ethyl mercaptan concentration was fairly high, e.g. 30 ppm or higher, when only two strokes were used. The blank used for comparison was the weathered tank of similar size, since all the passivated tanks had been weathered.

The concentration of ethyl mercaptan in the vapor phase was expected to vary with temperature because of the changes in relative volatility of ethyl mercaptan and propane, i.e. the k values. A concentration of 8 ppm (v/v) was chosen as the original ethyl mercaptan concentration for all tanks. This number, which was appropriate for comparison purposes, did not represent the probable concentration at the start of the six month test, since the temperature at that time was low; instead it corresponded to the probable concentration at the end of the test when the temperatures were expected to reach over 80° F., based on the known amount of ethyl mercaptan injected in the bulk LP-gas at the start of the test.

In the early part of the test some of the readings obtained with the stain tubes were adjusted according to ambient temperature. A correction factor provided by the manufacturer of the tubes was be used for outside temperatures below 68° F.

Figure 2:
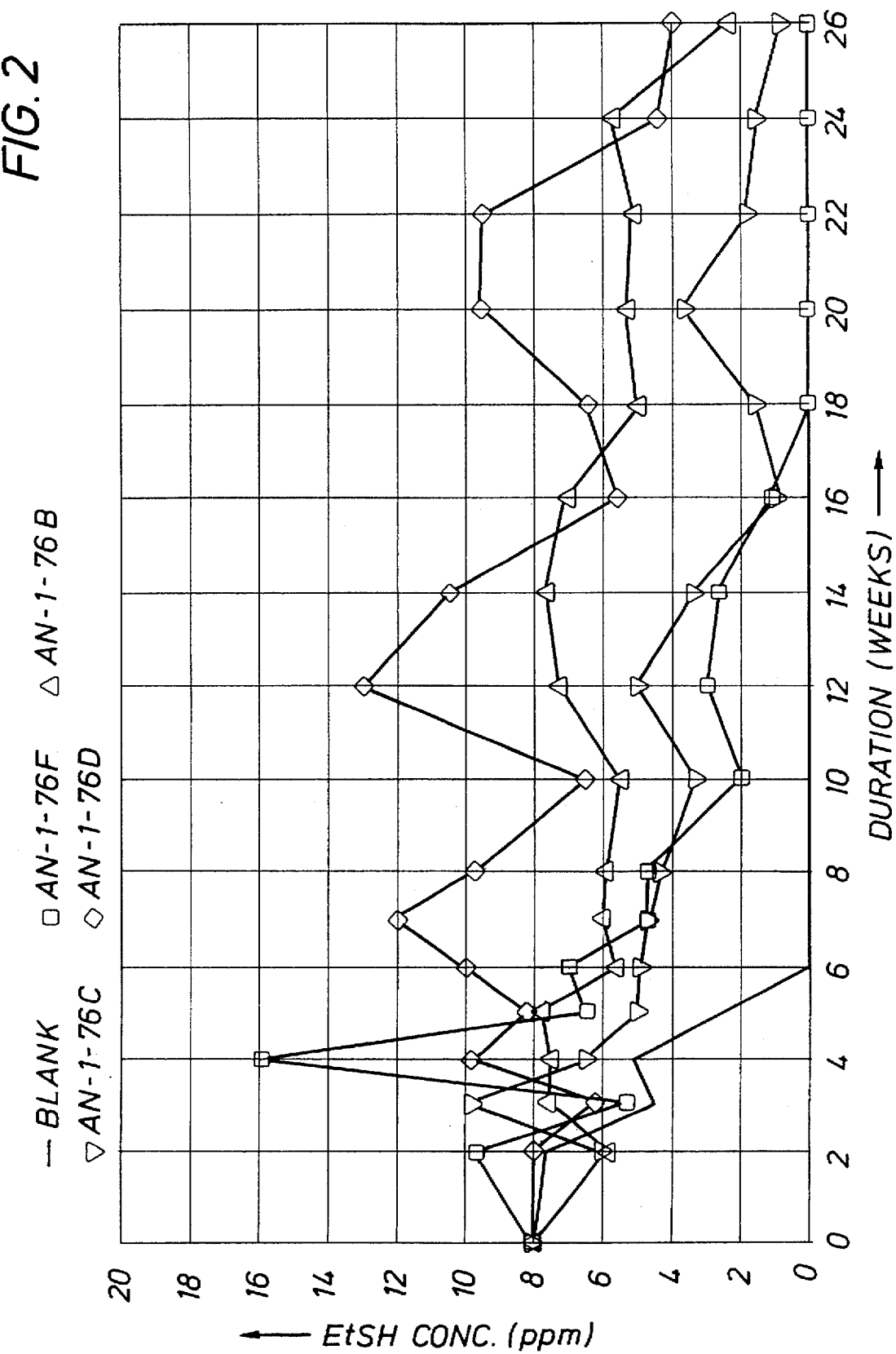
FIG. 2 represents the ethyl mercaptan (EM) concentrations of passivating agents AN-1-76B, AN-1-76C, AN-1-76D, AN-1-76F and the blank in the vapor phase in a 120 gallon tank over a 26 week period.
Figure 3:
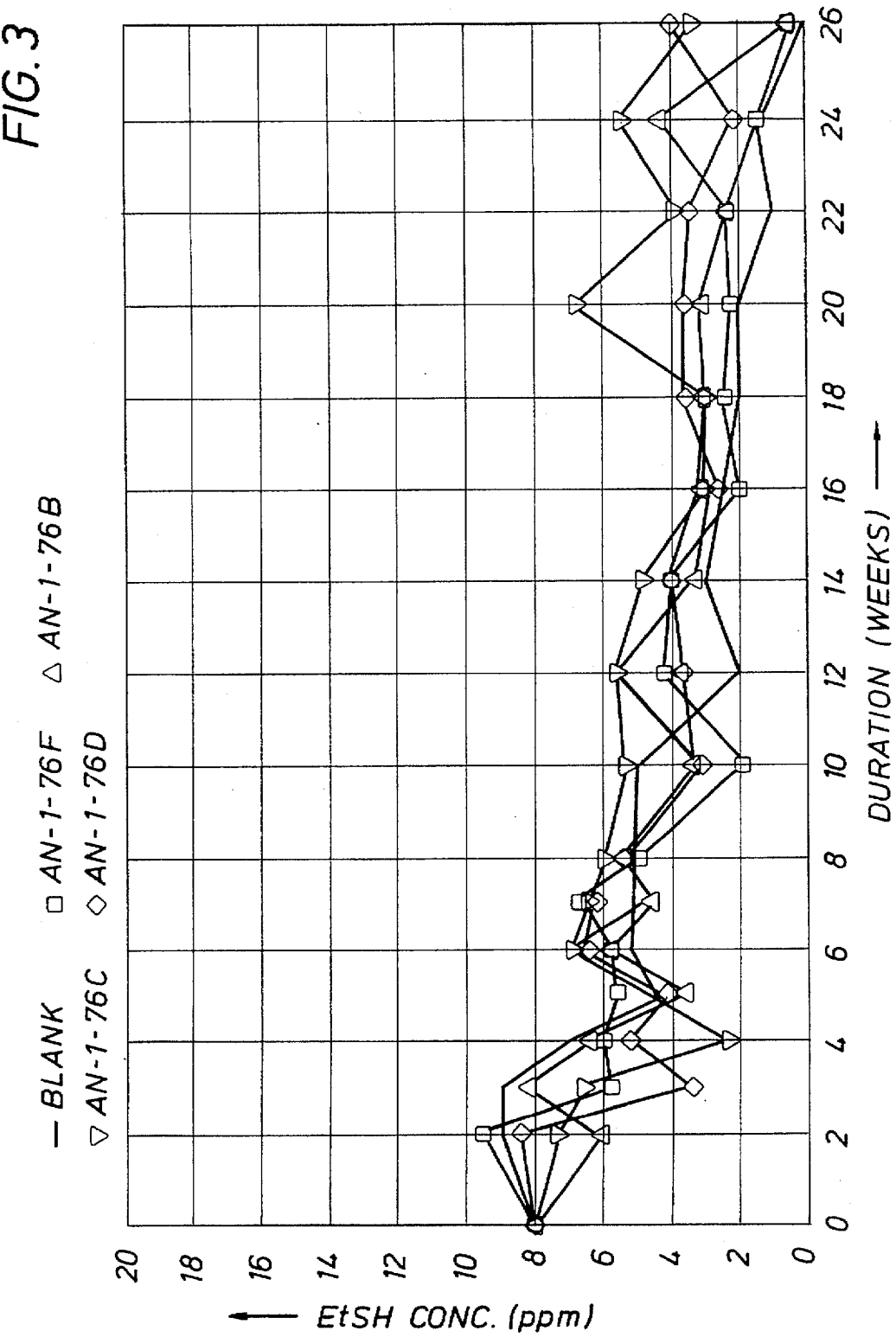
FIG. 3 represents the ethyl mercaptan (EM) concentrations of passivating agents AN-1-76B, AN-1-76C, AN-1-76D, AN-1-76F and the blank in the vapor phase in a 25 gallon tank over a 26 week period.
Figure 4:
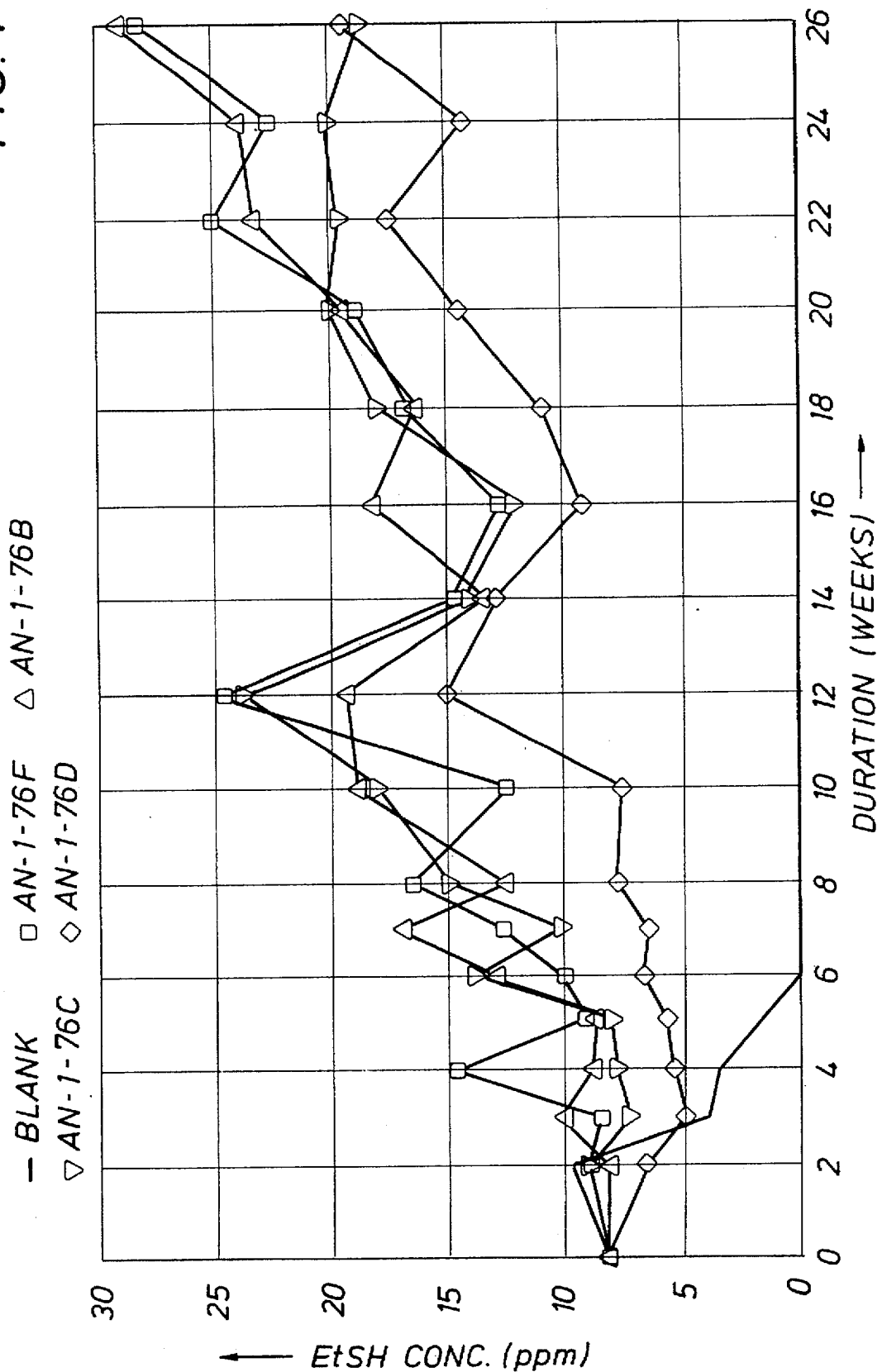
FIG. 4 represents the ethyl mercaptan (EM) concentrations of passivating agents AN-1-76B, AN-1-76C, AN-1-76D, AN-1-76F and the blank in the vapor phase in a 5 gallon tank over a 26 week period.

FIGS. 1–4 represent the ethyl mercaptan for all passivating agents and the blank grouped by tank size. As shown in these FIGURES, for the four tank sizes:

250 gallons: The blank lost the odorant by week 10. Two passivating agents, AN-1-76C and AN-1-76D preserved significant amounts of odorant. These two passivating agents are clearly superior to the other two agents which had lost the odorant by the end of the test.

120 gallons: The blank lost the odorant by week 6. The two water soluble passivating agents, AN-1-76B and AN-1-76D preserved significant amounts of odorant, with AN-1-76D being the best. The propane dispersible AN-1-76C preserved a low concentration of odorant, while AN-1-76F had lost the odorant before the end of the test.

25 gallons: The blank lost the odorant after 6 months. Two passivating agents, AN-1-76C and AN-1-76D preserved about 50% of the original concentration of odorant.

5 gallons: The blank lost the odorant by week 6. All passivating agents work very well for this tank size. The ethyl mercaptan concentration at the end of the test was greater than the original concentration. This can be explained by the fact that every sampling act in a 5 gallon tank significantly affects the volume of LP-gas left in the tank, whereas for the larger size tanks the same volume of gas sampled over the duration of the test has a much smaller effect on the volume of unvaporized liquid.

Another smaller scale test was conducted utilizing the additive treatment method of passivation. For this test, tanks #1, 2, 11, and 12, which had previously been used as blanks, were emptied and left outdoors for 30 days with their valves opened. To each tank was added 250 ppm (v/v) of the passivating agent, based on an 80% fill-up of the tank. The same day, after having been purged twice, the tanks were filled with LP-gas. The passivating agents selected for this test were AN-1-76C, which is dispersible in LP-gas, and AN-1-76E, which is formulated to be completely soluble in LP-gas. Tank assignment for this test is set forth in TABLE 3.

TABLE 3

| Tank # | Tank Size | Passivating Agent |
|---|---|---|
| 1 | 250 gal. | AN-1-76C |
| 2 | 250 gal. | AN-1-76E |
| 11 | 120 gal. | AN-1-76C |
| 12 | 120 gal. | AN-1-76E |

A Hewlett-Packard 5890 plus gas chromatograph (GC) with a flame ionization detector (FID) and a sulfur chemiluminescence detector (SCLD, Antek Instruments, Inc.) was used to collect the data. The GC column was supplied by Supelco, Inc. ASTM method D5504-94 was used to establish the performance of the GC-SCLD system.

The GC sampling system consisted of a needle valve, a gas sample valve, and a liquid sample valve. These three valves were connected in series to each other and to the GC inlet port using a 1/16" Silicosteel tubing. For accurate reproducible results it was necessary to passivate the inner surfaces of the sampling system by sulfiding it and by minimizing the contamination with air (oxygen). The passivation procedure consisted of repeated injection of hexane and gas solutions of ethyl mercaptan and diethyl disulfide through the sampling system into the GC column, until the peak areas for the two compounds were reproducible. To protect passivated surfaces, diffusion of air into the sampling system was reduced by closing the needle valve during changeover of the sample containers. Additionally, the sample lines were kept filled with a calibration gas when the system was not in use.

Liquid propane from the test tanks was sampled using a 150 ml pressurized sample container known as a Welker unit. Stainless steel Quick connect fittings or hoses with Quick connect fittings were used to attach the Welker unit to the propane tanks or the GC sampling system. Before each use, the Welker unit was flushed with oxygen-free nitrogen for about a minute to purge off any residual propane in the sampler and to protect the unit from air contamination. While collecting the LP-gas sample, liquid propane was allowed to flow through the samplers for at least 30 seconds thus protecting the sample from air contamination.

An external standard method was used to convert observed GC peak areas in LP-gas samples to concentrations. The concentration of the odorant, ethyl mercaptan (EM), was measured in each tank and samples taken from the trucks used to charge the tanks with LP-gas. Diethyl disulfide (DEDS) and an unknown, tentatively identified as diethyl trisulfide (ETS) were detected by the GC analyses and measured along with EM. System performance was monitored using a set of gas calibration standards (helium or gas standards) to calibrate the unit. Calibration gases were delivered to the GC sample valve (1 ml) at 44 psig. All LP-gas samples were delivered to the GC gas sample valve (1 ml) at 150 psig. For ideal gases, the weight of a gas in a fixed loop filled at 44 psig inlet pressure would be approximately one third of the pressure at 150 psig. Therefore, the estimation of concentration based on the GC peak areas and external standards required corrections due to pressure differences.

Concentration was calculated according to the following formula:

Concentration (ng/mg)={[Peak Area ($10^6$ counts)/ml propane]× $AF \times WR_f$} in liquid propane where, Weighted Response Factor, $WR_f = [R_f(ng/10^6 \text{ counts})] \times$ the Pressure Factor/[Density, propane (1.8 mg/ml)]}

Area Factor, AF=36/[(peak area for EM×$WR_f$ for EM)+ (Sum of peak areas for DEDS and ETS×$WR_f$ for DEDS)].

Using the gas calibration data, and from plots of GC areas versus weight, ng, (ethyl mercaptan or other sulfur compounds), a response factor, $R_f$, was found by expressing the slope as ng/$10^6$ counts. Multiplication of the GC peak area in propane with the $R_f$ value gave ng/ml of ethyl mercaptan present in propane. Dividing ng/ml of ethyl mercaptan with density of propane (1.8 mg/ml) expressed results as ng/mg or ppm (w/w). The corrected concentrations were obtained by multiplying the product (ng/ml) with the pressure correction equal to a ratio of psig propane to psig helium.

Figure 5:
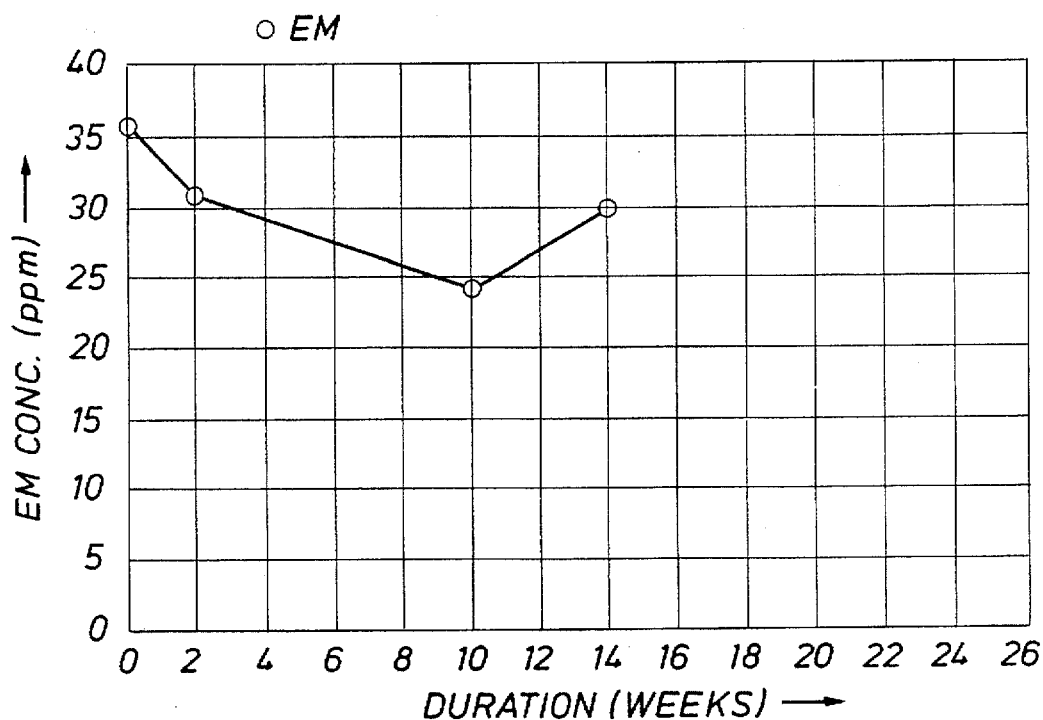
FIG. 5 represents the ethyl mercaptan (EM) concentrations of passivating agent AN-1-76C in the liquid phase in a 250 gallon tank over a 26 week period.
Figure 6:
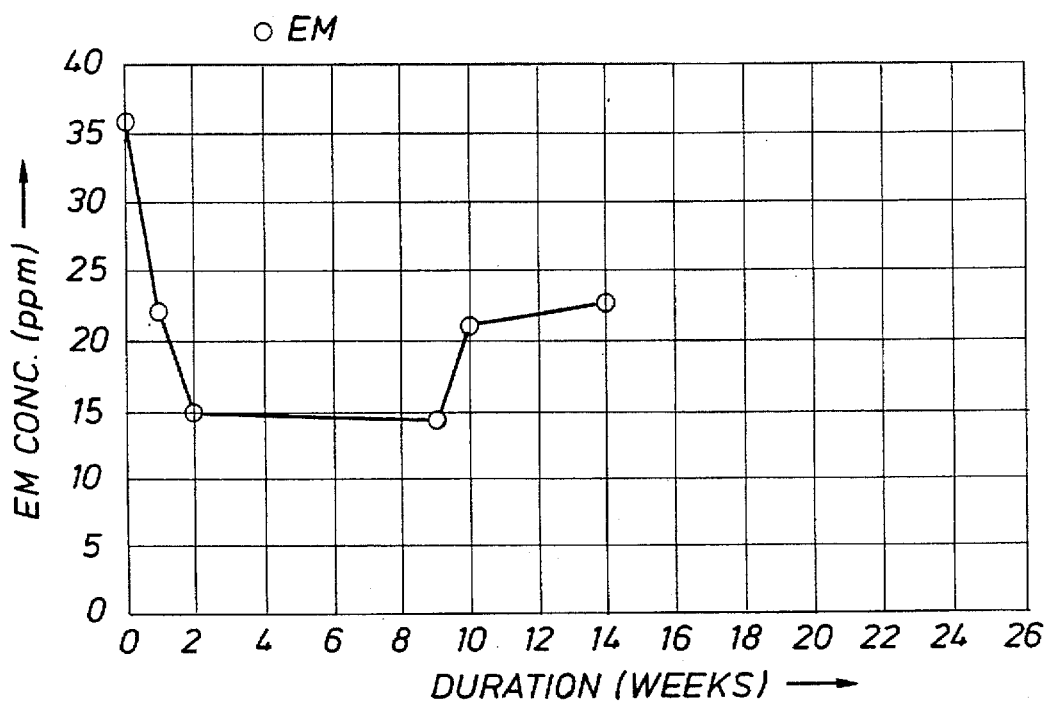
FIG. 6 represents the ethyl mercaptan (EM) concentrations of passivating agent AN-1-76C in the liquid phase in a 120 gallon tank over a 26 week period.
Figure 7:
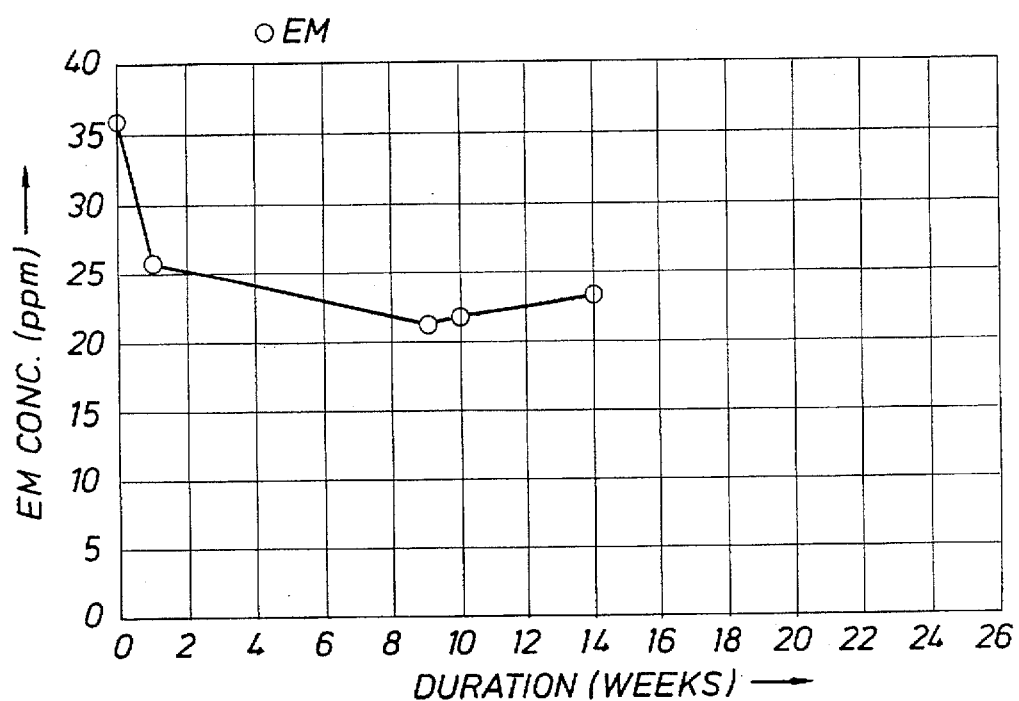
FIG. 7 represents the ethyl mercaptan (EM) concentrations of passivating agent AN-1-76E in the liquid phase in a 250 gallon tank over a 26 week period.
Figure 8:
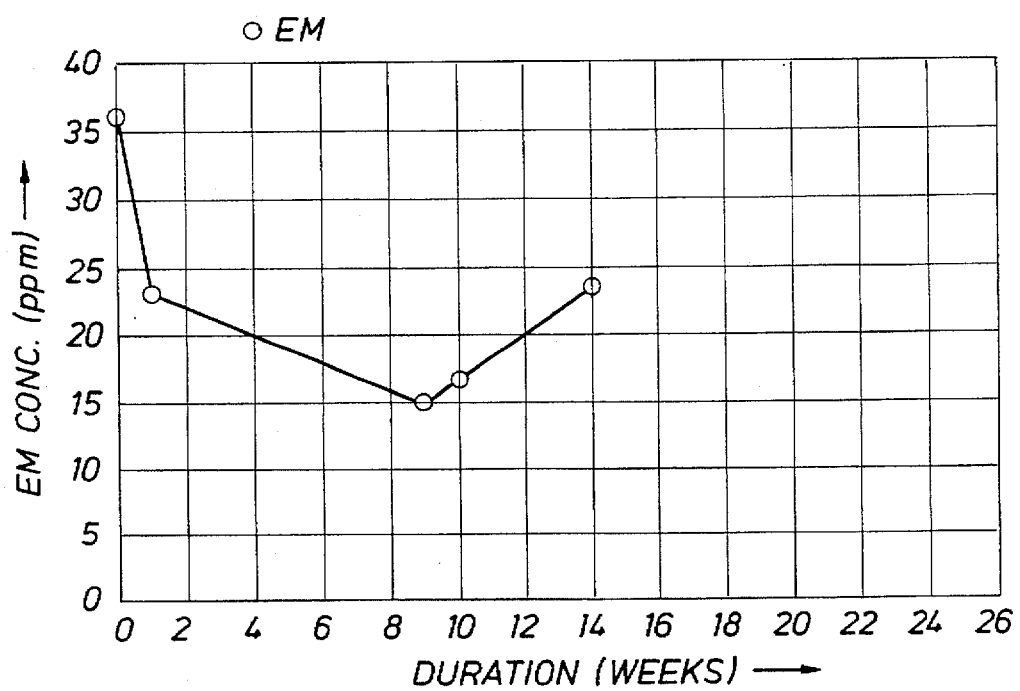
FIG. 8 represents the ethyl mercaptan (EM) concentrations of passivating agent AN-1-76E in the liquid phase in a 120 gallon tank over a 26 week period.

FIGS. 5-8 represent the ethyl mercaptan concentrations for the two passivating agents utilized in this test. As is shown in FIGS. 5-8, all four tanks contained significant amounts of odorant after three months.

Based on the foregoing tests, it is believed that the most effective method of reducing odorant depletion is a two stage treatment. That is, the tank should be initially treated with a passivating agent by the fill-up treatment method and thereafter treated with a propane soluble passivating agent by the additive treatment method.

A simple test was conducted in order to determine if the passivating agents would be carried out of the tank in the vapor phase. A commercial outdoor gas grill was connected to a tank previously passivated with AN-1-76C. The gas was burned for about 8 hours a day for several weeks. At the end of that period the grill was examined and no deposits were found on the gas burners. This test provides evidence that no burner fouling will take place when the vaporized LP-gas is used.

The foregoing description has been directed to particular embodiments of the invention for the purposes of illustration and explanation. It will be apparent, however, to those skilled in this art that many modifications and changes in the compositions and methods set forth will be possible without departing from the scope and spirit of the invention. It is intended that the following claims be interpreted to embrace all such modifications and changes.

What is claimed is:

1. A method for reducing odorant depletion during transfer and storage of liquefied petroleum gas comprising the steps of (a) completely filling a liquefied petroleum gas transfer or storage vessel with a passivating agent so that all interior surfaces of said vessel come in contact with said passivating agent, said passivating agent comprising one or more phosphate esters, the one or more phosphate esters defined by the equation:

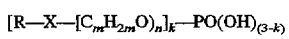

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), a secondary amine group (—NH—), sulfur (—S—);

m is an integer having a value from about 2 to about 4;
n is an integer having a value from about 1 to about 20; and
k is an integer having a value from 1 to 2
and one or more additional ingredients selected from the group consisting of fatty amines, poly amides, imidazolines, poly imidazolines, quaternary amines, poly quats, dimmer acids, trimmer acids, polymeric acids, ethoxylated fatty amines, and ethoxylated polyamides, and one or more solvents;

(b) draining said passivating agent from said vessel; and (c) evacuating said vessel prior to the introduction of said liquefied petroleum gas into said vessel.

2. The method of claim 1 wherein said one or more solvents are selected from the group consisting of water, glycol ether, and said one or more additional ingredients are selected from the group consisting of morpholine or cyclohexylamine or mixtures of morpholine and cyclohexylamine, quaternary amines, imidazoline, polymeric acids, and ethoxylated polyamides.

3. The method of claim 2 wherein said passivating agent comprises from about 10 to about 30 weight % water;

from about 10 to about 30 weight % glycol ether;

from about 5 to about 15 weight % morpholine or cyclohexylamine or a mixture of morpholine and cyclohexylamine;

from about 10 to about 19 weight % quaternary amines;

from about 10 to about 25 weight % imidazoline;

from about 5 to about 15 weight % polymeric acids;

from about 10 to about 15 weight % phosphate ester; and from about 5 to about 17 weight % ethoxylated polyamides.

4. The method of claim 3 wherein said passivating agent comprises about 20 weight % water;

about 20 weight % glycol ether;

about 5 weight % morpholine or cyclohexylamine or a mixture of morpholine and cyclohexylamine;

about 8 weight % quaternary amines;

about 15 weight % imidazoline;

about 10 weight % polymeric acids;

about 14 weight % phosphate ester; and about 8 weight % ethoxylated polyamides.

5. The method of claim 1 wherein said solvent comprises water, and said one or more additional ingredients are selected from the group consisting of quaternary amines, imidazoline, and isopropanol.

6. The method of claim 5 wherein said passivating agent comprises from about 20 to about 35 weight % water;

from about 8 to about 15 weight % quaternary amines;

from about 20 to about 40 weight % phosphate esters;

from about 6 to about 26 weight % imidazoline; and from about 5 to about 15 weight % isopropanol.

7. The method of claim 6 wherein said passivating agent comprises about 30 weight % water;

about 10 weight % quaternary amines;

about 40 weight % phosphate esters;

about 10 weight % imidazoline; and about 10 weight % isopropanol.

8. The method of claim 1 wherein said solvent comprises aromatic solvent, and said one or more additional ingredients are selected from the group consisting of imidazoline, and polymeric acids.

9. The method of claim 8 wherein said passivating agent comprises from about 25 to about 40 weight % aromatic solvent;

from about 25 to about 40 weight % imidazoline;

from about 7 to about 16 weight % phosphate esters; and from about 16 to about 30 weight % polymeric acids.

10. The method of claim 9 wherein said passivating agent comprises about 40 weight % aromatic solvent;

about 40 weight % imidazoline;

about 10 weight % phosphate ester; and about 10 weight % polymeric acids.

11. The method of claim 1 wherein said solvent comprises glycol ether, and said one or more additional ingredients are selected from the group consisting of imidazoline, and fatty acids.

12. The method of claim 11 wherein said passivating agent comprises from about 15 to about 35 weight % glycol ether;

from about 38 to about 77 weight % imidazoline;

from about 3 to about 11 weight % fatty acids; and from about 2 to about 15 weight % phosphate esters.

13. The method of claim 12 wherein said passivating agent comprises about 26 weight % glycol ether;

about 66 weight % imidazoline;

about 4 weight % fatty acids; and about 4 weight % phosphate esters.

14. A method for reducing odorant depletion during transfer and storage of liquefied petroleum gas comprising the step of (a) adding a passivating agent that is dispersible or soluble in propane directly to said liquefied petroleum gas in a transportation or storage vessel along with said odorant in an amount sufficient to provide a concentration of said passivating agent in the range of up to about 250 ppm (v/v), said passivating agent comprising one or more phosphate esters, said one or more phosphate esters defined by the equation:

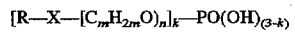

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), a secondary amine group (—NH—), sulfur (—S—);

m is an integer having a value from about 2 to about 4;

n is an integer having a value from about 1 to about 20; and k is an integer having a value from 1 to 2 and one or more additional ingredients selected from the group consisting of fatty amines, poly amides, imidazolines, poly imidazolines, quaternary amines, poly quats, dimmer acids, trimmer acids, polymeric acids, ethoxylated fatty amines, and ethoxylated polyamides, and one or more solvents.

15. The method of claim 14 wherein said solvent comprises aromatic solvent, and said one or more additional ingredients are selected from the group consisting of imidazoline and polymeric acids.

16. The method of claim 15 wherein said passivating agent comprises from about 25 to about 40 weight % aromatic solvent;

from about 25 to about 40 weight % imidazoline;

from about 7 to about 16 weight % phosphate esters; and from about 16 to about 30 weight % polymeric acids.

17. The method of claim 16 wherein said passivating agent comprises about 40 weight % aromatic solvent;

about 40 weight % imidazoline;

about 10 weight % phosphate ester; and about 10 weight % polymeric acids.

18. The method of claim 14 wherein said solvent comprises glycol ether, and said one or more additional ingredients a elected from the group consisting of imidazoline, and fatty acids.

19. The method of claim 18 wherein said passivating agent comprises from about 15 to about 35 weight % glycol ether;

from about 38 to about 77 weight % imidazoline;

from about 3 to about 11 weight % fatty acids; and from about 2 to about 15 weight % phosphate esters.

20. The method of claim 19 wherein said passivating agent comprises about 26 weight % glycol ether;

about 66 weight % imidazoline;

about 4 weight % fatty acids; and about 4 weight % phosphate esters.

21. A method for reducing odorant depletion during transfer and storage of liquefied petroleum gas comprising the steps of (a) completely filling a liquefied petroleum gas transfer or storage vessel with a first passivating agent so that all interior surfaces of the vessel come in contact with said first passivating agent, (b) draining said first passivating agent from said vessel;

(c) evacuating said vessel;

(d) filling said vessel with liquefied petroleum gas;

(e) adding an odorant compound to said liquefied petroleum gas in said vessel; and (f) adding a second passivating agent that is dispersible or solublein propane directly to said liquefied petroleum gas along with said odorant in an amount sufficient to provide a concentration of said second passivating agent in the range of up to about 250 ppm (v/v);

said first and second passivating agents are different mixtures of compounds, and wherein each said mixture comprises one or more phosphate esters defined by the equation:

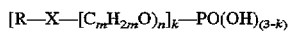

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), a secondary amine group (—NH—), sulfur (—S—);

m is an integer having a value from about 2 to about 4;

n is an integer having a value from about 1 to about 20; and k is an integer having a value from 1 to 2 and one or more additional ingredients selected from the group consisting of fatty amines, poly amides, imidazolines, poly imidazolines, quaternary amines, poly quats, dimmer acids, trimmer acids, polymeric acids, ethoxylated fatty amines, and ethoxylated polyamides, and one or more solvents.

22. A method for reducing odorant depletion during transfer and storage of liquefied petroleum gas comprising the steps of (a) completely filling a liquefied petroleum gas transfer or storage vessel with a passivating agent so that all interior surfaces of the vessel come in contact with said passivating agent comprising (i) corrosion inhibitors selected from both of two groups, the first group consisting of phosphate esters defined by the equation:

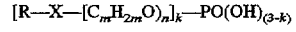

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), a secondary amine group (—NH—), sulfur (—S—);

m is an integer having a value from about 2 to about 4;

n is an integer having a value from about 1 to about 20; and k is an integer having a value from 1 to 2;

and the second group consisting of fatty amines, poly amides, imidazolines, poly imidazolines, ethoxylated fatty amines, ethoxylated poly amides, and ethoxylated alcohols, and (ii) one or more solvents, (b) draining said passivating agent from said vessel; and (c) evacuating said vessel prior to the introduction of said liquefied petroleum gas into said vessel.

* * * * *